United States Patent
Covell et al.

(10) Patent No.: US 12,154,593 B2
(45) Date of Patent: *Nov. 26, 2024

(54) METHODS, SYSTEMS, AND MEDIA FOR SEAMLESS AUDIO MELDING BETWEEN SONGS IN A PLAYLIST

(71) Applicant: Google LLC, Mountain View, CA (US)

(72) Inventors: Michele Covell, Woodside, CA (US); Shumeet Baluja, San Diego, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/204,720

(22) Filed: Jun. 1, 2023

(65) Prior Publication Data

US 2023/0307003 A1  Sep. 28, 2023

Related U.S. Application Data

(63) Continuation of application No. 17/542,757, filed on Dec. 6, 2021, now Pat. No. 11,670,338, which is a
(Continued)

(51) Int. Cl.
G11B 27/02 (2006.01)
G10L 21/10 (2013.01)
G11B 27/10 (2006.01)

(52) U.S. Cl.
CPC .............. G11B 27/02 (2013.01); G10L 21/10 (2013.01); G11B 27/10 (2013.01)

(58) Field of Classification Search
CPC .......... G11B 27/02; G11B 27/10; G10L 21/10
See application file for complete search history.

(56) References Cited

U.S. PATENT DOCUMENTS 5,749,073 A     5/1998  Slaney
9,318,122 B2 *  4/2016  Otani ................... G10L 19/022
(Continued)

FOREIGN PATENT DOCUMENTS

JP    H07220394    8/1995
JP    H08305393    11/1996
(Continued)

OTHER PUBLICATIONS

Office Action dated Jun. 28, 2023 in KR Patent Application No. 10-2022-7022692.
(Continued)

*Primary Examiner* — Thai Q Tran
*Assistant Examiner* — Jose M Mesa
(74) *Attorney, Agent, or Firm* — Shumaker & Sieffert, P.A.

(57) ABSTRACT

In accordance with some embodiments of the disclosed subject matter, mechanisms for seamless audio melding between audio items in a playlist are provided. In some embodiments, a method for transitioning between audio items in playlists is provided, comprising: identifying a sequence of audio items in a playlist of audio items, wherein the sequence of audio items includes a first audio item and a second audio item that is to be played subsequent to the first audio item; and modifying an end portion of the first audio item and a beginning portion of the second audio item, where the end portion of the first audio item and the beginning portion of the second audio item are to be played concurrently to transition between the first audio item and the second audio item, wherein the end portion of the first audio item and the beginning portion of the second audio item have an overlap duration, and wherein modifying the end portion of the first audio item and the beginning portion
(Continued)

of the second audio item comprises: generating a first spectrogram corresponding to the end portion of the first audio item and a second spectrogram corresponding to the beginning portion of the second audio item; identifying, for each frequency band in a series of frequency bands, a window over which the first spectrogram within the end portion of the first audio item and the second spectrogram within the beginning portion of the second audio item have a particular cross-correlation; modifying, for each frequency band in the series of frequency bands, the end portion of the first spectrogram and the beginning portion of the second spectrogram such that amplitudes of frequencies within the frequency band decrease within the first spectrogram over the end portion of the first spectrogram and that amplitudes of frequencies within the frequency band increase within the second spectrogram over the beginning portion of the second spectrogram; and generating a modified version of the first audio item the includes the modified end portion of the first audio item based on the modified end portion of the first spectrogram and generating a modified version of the second audio item that includes the modified beginning portion of the second audio item based on the modified beginning portion of the second spectrogram.

20 Claims, 8 Drawing Sheets

Related U.S. Application Data continuation of application No. 17/009,001, filed on Sep. 1, 2020, now Pat. No. 11,195,553, which is a continuation of application No. PCT/US2019/063950, filed on Dec. 2, 2019.

(56) References Cited

U.S. PATENT DOCUMENTS

| | | | |
|---|---|---|---|
| 9,344,815 B2 | 5/2016 | Selig et al. | |
| 10,417,279 B1 | 9/2019 | Beech | |
| 2003/0205124 A1 | 11/2003 | Foote et al. | |
| 2006/0074649 A1* | 4/2006 | Pachet | G10H 7/02 |
| | | | 704/229 |
| 2007/0291958 A1 | 12/2007 | Jehan | |
| 2008/0249644 A1 | 10/2008 | Jehan | |
| 2018/0095715 A1 | 4/2018 | Jehan et al. | |
| 2018/0315433 A1* | 11/2018 | Goodwin | G10L 19/26 |

FOREIGN PATENT DOCUMENTS

| | | |
|---|---|---|
| JP | H0981189 | 3/1997 |
| JP | 2001255876 | 9/2001 |
| JP | 2016522453 | 7/2016 |

OTHER PUBLICATIONS

Avidan, S. & Shamir, A., "Seam Carving for Content-Aware Image Resizing", in ACM Transactions on Graphics, vol. 26, No. 3, Jul. 2007, pp. 1-9.
Examination Report dated Oct. 19, 2022 in IN Patent Application No. 202247035729.
Gu et al., "A New Optimal Seam Selection Method for Airborne Image Stitching", in Proceedings of the International Workshop on Imaging Systems and Techniques, Shenzhen, China, May 11-12, 2009, pp. 1-6.
International Search Report and Written Opinion dated Aug. 28, 2020 in International Patent Application No. PCT/US2019/063950.
Notice of Allowance dated Jan. 26, 2023 in U.S. Appl. No. 17/542,757.
Notice of Allowance dated Jul. 30, 2021 in U.S. Appl. No. 17/009,001.
Office Action dated Dec. 19, 2022 in JP Patent Application No. 2022-532834.
Veire, L. V., "From Raw Audio to a Seamless Mix: an Artificial Intelligence Approach to Creating an Automated DJ System", Technical Report, Department of Electronics and Information Systems, Ghent University, Jun. 2017, pp. 1-119.
Wikipedia, "Seam Carving", last accessed Aug. 27, 2020, pp. 1-4, available at: https://en.wikipedia.org/wiki/Seam_carving.
Notice of Intent to Grant from counterpart Indian Application No. 202247035729 dated Jun. 7, 2024, 1 pp.
"Hearing Aid Audio Support Using Bluetooth LE", Accessed on: Apr. 25, 2019, Retrieved from: https://source.android.com/docs/core/connect/bluetooth/asha, 12 pp.
Notice of Intent to Grant and translation thereof, from counterpart Korean Application No. 10-2022-7022692 dated Dec. 28, 2023, 4 pp.
Response to Communication Pursuant to Rules 161(1) and 162 EPC dated May 19, 2022, from counterpart European Application No. 19824155.6, filed Nov. 29, 2022, p. 25.
Response to Office Action dated Oct. 19, 2022, from counterpart Indian Application No. 202247035729 filed Apr. 18, 2023, 12 pp.
Notice of Intent to Grant and Text Intended to Grant from counterpart European Application No. 19824155.6 dated Sep. 5, 2024, 49 pp.

* cited by examiner

METHODS, SYSTEMS, AND MEDIA FOR SEAMLESS AUDIO MELDING BETWEEN SONGS IN A PLAYLIST

CROSS-REFERENCE TO RELATED APPLICATIONS

This application is a continuation of U.S. patent application Ser. No. 17/542,757, filed Dec. 6, 2021, which is a continuation of U.S. patent application Ser. No. 17/009,001, filed Sep. 1, 2020, which is a continuation of International Patent Application No. PCT/US2019/063950, filed Dec. 2, 2019, each of which is hereby incorporated by reference herein in its entirety.

TECHNICAL FIELD

The disclosed subject matter relates to methods, systems, and media for seamless audio melding between two audio items. The disclosed subject matter may be applied in, for example, a speech synthesis system.

BACKGROUND

Speech synthesis systems are becoming increasingly used. Some speech synthesis systems operate using pre-recorded audio segments that represent a sound unit such as a word or words. Multiple audio segments are joined (or "concatenated") to produce an output audio phrase from the speech synthesis system. It is sometimes desirable to add further pre-recorded audio segments to a speech synthesis system to allow the range of output phrases to be changed or broadened, or to amend or replace one of the existing pre-recorded segments, but it is difficult to do this so that the tempo and volume of the new segments match the tempo and volume of the existing audio segments—instead, the transition is often perceptible to the listener. This can degrade the quality of output audio generated by the speech synthesis systems, and may, for example, lead to an output phrase being difficult for a user to understand correctly. Moreover, current systems disregard, among other things, the different energy information between the two audio segments.

Accordingly, it is desirable to provide new methods, systems, and media for seamless audio melding between two audio items, such as speech segments for a speech synthesis system.

SUMMARY

Methods, systems, and media for seamless audio melding between audio items are provided.

In accordance with some embodiments of the disclosed subject matter, a method for transitioning between audio items in playlists is provided, the method comprising: identifying a sequence of audio items in a playlist of audio items, wherein the sequence of audio items includes a first audio item and a second audio item that is to be played subsequent to the first audio item; and modifying an end portion of the first audio item and a beginning portion of the second audio item, where the end portion of the first audio item and the beginning portion of the second audio item are to be played concurrently to transition between the first audio item and the second audio item, wherein the end portion of the first audio item and the beginning portion of the second audio item have an overlap duration, and wherein modifying the end portion of the first audio item and the beginning portion of the second audio item comprises: generating a first spectrogram corresponding to the end portion of the first audio item and a second spectrogram corresponding to the beginning portion of the second audio item; identifying, for each frequency band in a series of frequency bands, a window over which the first spectrogram within the end portion of the first audio item and the second spectrogram within the beginning portion of the second audio item have a particular cross-correlation; modifying, for each frequency band in the series of frequency bands, the end portion of the first spectrogram and the beginning portion of the second spectrogram such that amplitudes of frequencies within the frequency band decrease within the first spectrogram over the end portion of the first spectrogram and that amplitudes of frequencies within the frequency band increase within the second spectrogram over the beginning portion of the second spectrogram; and generating a modified version of the first audio item the includes the modified end portion of the first audio item based on the modified end portion of the first spectrogram and generating a modified version of the second audio item that includes the modified beginning portion of the second audio item based on the modified beginning portion of the second spectrogram.

In some embodiments, the method further comprises identifying the overlap duration based on the first spectrogram and the second spectrogram.

In some embodiments, identifying, for each frequency band in the series of frequency bands, the window over which the first spectrogram within the end portion of the first audio item and the second spectrogram within the beginning portion of the second audio item have a high cross-correlation comprises: identifying a first window for a lowest frequency band in the series of frequency bands based on the cross-correlation of the end portion of the first spectrogram and the beginning portion of the second spectrogram within the lowest frequency band; and identifying a second window for a frequency band adjacent to the lowest frequency band based on the cross-correlation of the end portion of the first spectrogram and the beginning portion of the second spectrogram within the frequency band adjacent to the lowest frequency band, wherein the second window is shorter than the first window.

In some embodiments, the second window overlaps with the first window.

In some embodiments, phases of a spectrogram of the modified end portion of the first audio item superposed with the modified beginning portion of the second audio item match phases of the first audio item at a beginning portion of the overlap and match phases of the second audio item at an end portion of the overlap.

In some embodiments, modifying the end portion of the first audio item and the beginning portion of the second audio item comprises modifying a tempo of the first audio item during the end portion of the first audio item and a tempo of the second audio item during the beginning portion of the second audio item.

In some embodiments, modifying the tempo of the first audio item during the end portion of the first audio item and the tempo of the second audio item during the beginning portion of the second audio item is in response to determining that the tempo of the first audio item during the end portion of the first audio item differs from the tempo of the second audio item during the beginning portion of the second audio item by more than a predetermined threshold.

In some embodiments, causing the playlist of audio items by the user device comprises transmitting the modified version of the first audio item and the modified version of the second audio item to the user device in connection with an indication of the overlap duration.

In some embodiments, the method further comprises storing the modified version of the first audio item and the modified version of the second audio item in connection with an identifier of the playlist of audio items.

In some embodiments, the method further comprises: receiving, from a user device, a request to present the playlist of audio items; and causing the playlist of audio items to be presented by the user device, wherein presenting the playlist of audio items comprises presenting the modified version of the first audio item and the modified version of the second audio item, and wherein the modified end portion of the modified version of the first audio item is played concurrently with the modified beginning portion of the modified version of the second audio item.

In accordance with some embodiments of the disclosed subject matter, a system for transitioning between audio items in playlists is provided, the system comprising a memory and a hardware processor that, when executing computer-executable instructions in the memory, is configured to: identify a sequence of audio items in a playlist of audio items, wherein the sequence of audio items includes a first audio item and a second audio item that is to be played subsequent to the first audio item; and modify an end portion of the first audio item and a beginning portion of the second audio item, where the end portion of the first audio item and the beginning portion of the second audio item are to be played concurrently to transition between the first audio item and the second audio item, wherein the end portion of the first audio item and the beginning portion of the second audio item have an overlap duration, and wherein modifying the end portion of the first audio item and the beginning portion of the second audio item comprises: generating a first spectrogram corresponding to the end portion of the first audio item and a second spectrogram corresponding to the beginning portion of the second audio item; identifying, for each frequency band in a series of frequency bands, a window over which the first spectrogram within the end portion of the first audio item and the second spectrogram within the beginning portion of the second audio item have a particular cross-correlation; modifying, for each frequency band in the series of frequency bands, the end portion of the first spectrogram and the beginning portion of the second spectrogram such that amplitudes of frequencies within the frequency band decrease within the first spectrogram over the end portion of the first spectrogram and that amplitudes of frequencies within the frequency band increase within the second spectrogram over the beginning portion of the second spectrogram; and generating a modified version of the first audio item the includes the modified end portion of the first audio item based on the modified end portion of the first spectrogram and generating a modified version of the second audio item that includes the modified beginning portion of the second audio item based on the modified beginning portion of the second spectrogram.

In accordance with some embodiments of the disclosed subject matter, a computer-readable medium containing computer executable instructions that, when executed by a processor, cause the processor to perform a method for transitioning between audio items in playlists is provided, the method comprising: identifying a sequence of audio items in a playlist of audio items, wherein the sequence of audio items includes a first audio item and a second audio item that is to be played subsequent to the first audio item; and modifying an end portion of the first audio item and a beginning portion of the second audio item, where the end portion of the first audio item and the beginning portion of the second audio item are to be played concurrently to transition between the first audio item and the second audio item, wherein the end portion of the first audio item and the beginning portion of the second audio item have an overlap duration, and wherein modifying the end portion of the first audio item and the beginning portion of the second audio item comprises: generating a first spectrogram corresponding to the end portion of the first audio item and a second spectrogram corresponding to the beginning portion of the second audio item; identifying, for each frequency band in a series of frequency bands, a window over which the first spectrogram within the end portion of the first audio item and the second spectrogram within the beginning portion of the second audio item have a particular cross-correlation; modifying, for each frequency band in the series of frequency bands, the end portion of the first spectrogram and the beginning portion of the second spectrogram such that amplitudes of frequencies within the frequency band decrease within the first spectrogram over the end portion of the first spectrogram and that amplitudes of frequencies within the frequency band increase within the second spectrogram over the beginning portion of the second spectrogram; and generating a modified version of the first audio item the includes the modified end portion of the first audio item based on the modified end portion of the first spectrogram and generating a modified version of the second audio item that includes the modified beginning portion of the second audio item based on the modified beginning portion of the second spectrogram. The computer readable medium may be, but is not limited to, a non-transitory medium.

In accordance with some embodiments of the disclosed subject matter, a system for transitioning between audio items in playlists is provided, the system comprising: means for identifying a sequence of audio items in a playlist of audio items, wherein the sequence of audio items includes a first audio item and a second audio item that is to be played subsequent to the first audio item; and means for modifying an end portion of the first audio item and a beginning portion of the second audio item, where the end portion of the first audio item and the beginning portion of the second audio item are to be played concurrently to transition between the first audio item and the second audio item, wherein the end portion of the first audio item and the beginning portion of the second audio item have an overlap duration, and wherein modifying the end portion of the first audio item and the beginning portion of the second audio item comprises: means for generating a first spectrogram corresponding to the end portion of the first audio item and a second spectrogram corresponding to the beginning portion of the second audio item; means for identifying, for each frequency band in a series of frequency bands, a window over which the first spectrogram within the end portion of the first audio item and the second spectrogram within the beginning portion of the second audio item have a particular cross-correlation; means for modifying, for each frequency band in the series of frequency bands, the end portion of the first spectrogram and the beginning portion of the second spectrogram such that amplitudes of frequencies within the frequency band decrease within the first spectrogram over the end portion of the first spectrogram and that amplitudes of frequencies within the frequency band increase within the second spectrogram over the beginning portion of the second spectrogram; and means for generating a modified version of the first audio item the includes the modified end portion of the first audio item based on the modified end portion of the first spectrogram and generating a modified version of the second audio item that includes the modified beginning portion of the second audio item based on the modified beginning portion of the second spectrogram.

In an implementation, the system may be a speech synthesis system.

In accordance with some embodiments of the disclosed subject matter, a system for transitioning between audio items in playlists is provided, the system comprising: a memory; and a hardware processor that, when executing computer-executable instructions in the memory, is configured to perform a method according to any aspect or embodiments described herein.

In accordance with some embodiments of the disclosed subject matter, a computer-readable medium is provided, the computer readable medium containing computer executable instructions that, when executed by a processor, cause the processor to perform a method a method according to any aspect or embodiments described herein. The computer readable medium may be, but is not limited to, a non-transitory medium.

As an example, the audio items may be speech segments (for example, pre-recorded speech segments) for a speech synthesis system. The playlist arranges speech segments in an order in which it is desired for the speech segments to be reproduced by a speech synthesis system to provide a desired audible output phrase The disclosed methods, systems, and media are not however limited to use with a speech synthesis system, and the principles of the present disclosure have many potential applications. As another example, the audio items may be songs. The playlist arranges songs in an order in which it is desired for the songs to be reproduced/played.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
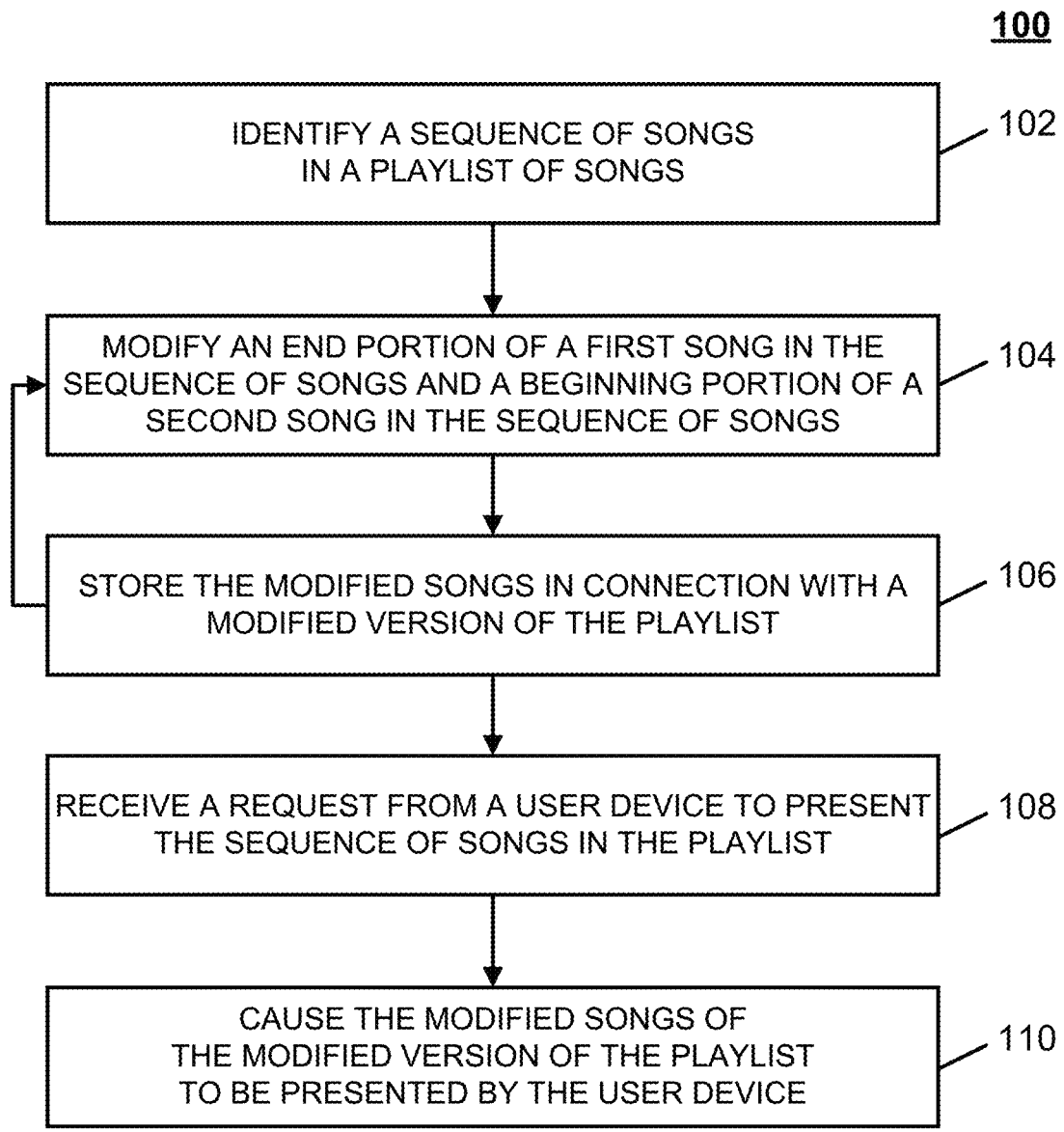
FIG. 1 shows an illustrative example of a process for generating and presenting a playlist of audio items with transitions between audio items in the playlist in accordance with some embodiments of the disclosed subject matter.

In accordance with various embodiments, mechanisms (which can include methods, systems, and media) for seamless audio melding between audio items in a playlist are provided.

Generally speaking, the mechanisms relate to transitioning between audio items in an ordered playlist by visually seam carving between an end portion of a first audio item and a beginning portion of a second audio item to indicate the times at which to transition specific frequencies from the first audio item to the second audio item.

In some embodiments, the mechanisms described herein can generate a smooth transition between two audio items in a playlist such that a first audio item A smoothly transitions to a second audio item B. In some embodiments, a smooth transition between audio item A and audio item B can include any suitable type of transition. For example, in some embodiments, the mechanisms described herein can generate modified versions of audio item A and audio item B such that, when an end portion of audio item A is overlapped or otherwise positioned over a beginning portion of audio item B, (1) the overlapping portions of audio items A and B are matched in tempo and/or beats, and (2) a volume of audio item A decreases and a volume of audio item B increases during the overlapping portion.

For convenience, the further detailed description refers to embodiments in which the audio items are songs but, as noted, the invention is not limited to this and the described methods, systems, and media may in principle be applied with other audio items.

As a more particular example, in some embodiments, the mechanisms described herein can generate modified versions of song A and song B such that song A transitions to song B by using tempo analysis to match a tempo of an end portion of song A to a beginning portion of song B, using beat analysis to align beats of an end portion of song A to beats of a beginning portion of song B, fading a volume of an end portion of song A into a beginning portion of song B, and/or any other suitable type of transition. In continuing this example, the mechanisms described herein can include carving the aligned spectrograms of song A and song B based on the quality of the energy match within each frequency region. In some embodiments, the mechanisms described herein can iterate through a sequence of songs included in a playlist such that smooth transitions are generated between each of the songs. In some embodiments, a modified playlist that includes smooth transitions between songs of the playlist can be provided to a user device for playback on the user device, as shown in and described below in connection with FIG. 1.

In some embodiments, the mechanisms described herein can generate a smooth transition between two songs in any suitable manner and using any suitable technique(s). For example, as shown in and described below in connection with FIG. 2, in some embodiments, the mechanisms can determine a duration of an end portion of a first song A and a duration of a beginning portion of a second song B over which song A and song B are to overlap during a transition between song A and song B based on identifying a portion of a spectrogram of song A and a spectrogram of song B that are most similar. As another example, in some embodiments, the mechanisms can modify tempos of song A and song B during the identified overlap portion of song A and song B. As yet another example, in some embodiments, the mechanisms can generate a transition between song A and song B such that an amplitude of song A fades or decreases during the transition and an amplitude of song B ramps up or increases during the transition. As a more particular example, in some embodiments, the mechanisms can generate the transition such that the amplitude of song A decreases during the transition and the amplitude of song B increases during the transition in a different manner in different frequency bands, rather than changing an amplitude during the transition in the same manner for all frequencies, as shown in and described below in connection with FIG. 2.

Turning to FIG. 1, an illustrative example 100 of a process for generating and presenting a playlist of songs with transitions between songs in the playlist is shown in accordance with some embodiments of the disclosed subject matter. In some embodiments, blocks of process 100 can be executed by any suitable device. For example, in some embodiments, blocks of process 100 can be executed by a server that stores and/or provides audio content items (e.g., songs, playlists of songs, and/or any other suitable audio content items) to user devices. As a more particular example, in some embodiments, blocks of process 100 can be executed by a server associated with a media content sharing service, a social networking service, and/or any other suitable server.

Process 100 can begin at 102 by identifying a sequence of songs in a playlist of songs. In some embodiments, process 100 can identify the sequence of songs in the playlist of songs in any suitable manner. For example, in some embodiments, process 100 can identify a playlist of songs that indicates identifiers of a group of songs included in the playlist and a sequence or order the songs in the group of songs are to be presented. Note that, in some embodiments, the playlist of songs can be created by any suitable entity. For example, in some embodiments, the playlist of songs can be a user-generated playlist that is associated with a particular user account. As another example, in some embodiments, the playlist of songs can be created by an artist or content creator and can be stored and/or provided in association with a channel associated with the artist or content creator. Additionally, note that, in some embodiments, the playlist of songs can include any suitable number of songs (e.g., two, three, five, ten, twenty, and/or any other suitable number).

At 104, process 100 can modify an end portion of a first song in the sequence of songs and a beginning portion of a second song that is included subsequent to the first song in the sequence of songs. In some embodiments, process 100 can modify the end portion of the first song and the beginning portion of the second song such that when the end portion of the first song and the beginning portion of the second song are played concurrently, there is a smooth transition from the first song to the second song. Note that, in some embodiments, the end portion of the first song and the beginning portion of the second song that are to be played concurrently are sometimes referred to herein as an overlap.

In some embodiments, process 100 can modify an end portion of the first song and the beginning portion of the second song in any suitable manner to generate a smooth transition between the first song and the second song. For example, in some embodiments, process 100 can modify the end portion of the first song and the beginning portion of the second song such that the end portion of the first song and the beginning portion of the second song have a similar tempo. As another example, in some embodiments, process 100 can modify the end portion of the first song and the beginning portion of the second song such that beats of the end portion of the first song are aligned with beats of the beginning portion of the second song. As yet another example, in some embodiments, process 100 can modify an amplitude of the end portion of the first song and an amplitude of the beginning portion of the second song such that the first song fades into the second song during a transition from the first song to the second song. As a more particular example, in some embodiments, process 100 can modify the amplitude of the end portion of the first song and the amplitude of the beginning portion of the second song by modifying amplitudes of different frequency bands at different time points to make an amplitude transition less perceptible than an amplitude transition across all frequencies at the same time. Note that more detailed techniques for modifying the end portion of the first song and the beginning portion of the second song are shown in and described below in connection with FIG. 2.

At 106, process 100 can store the modified songs (e.g., the first song with the modified end portion of the first song and the second song with the modified beginning portion of the second song) in connection with a modified version of the playlist. In some embodiments, process 100 can store the modified songs in connection with the modified version of the playlist in any suitable manner. For example, in some embodiments, process 100 can generate or initialize a new playlist corresponding to the modified version of the playlist. In some such embodiments, the new playlist can have an identifier that associates the modified version of the playlist with the original playlist. As another example, in some embodiments, process 100 can replace the first song and the second song in the playlist of songs with the modified version of the first song and the modified version of the second song. As yet another example, in some embodiments, process 100 can store an indication of a duration of the overlap between the first song and the second song (e.g., a duration of the end portion of the first song and a duration of the beginning portion of the second song) such that a user device that plays the playlist of songs can begin presentation of the second song such that the beginning portion of the second song corresponding to the overlap is played concurrently with the end portion of the first song corresponding to the overlap.

In some embodiments, process 100 can loop back to 104 and can modify an end portion of the second song and a beginning portion of a third song in the sequence of songs of the playlist to generate a seamless transition between the second song and the third song. In some embodiments, process 100 can loop through 104 and 106 until each of the songs in the playlist of songs have been modified to generate transitions between successive songs in the playlist.

In some embodiments, in response to detecting that a new song has been inserted into the playlist (or that the order of the playlist has been changed in which a different song follows the second song), process 100 can loop back to 104 and can modify an end portion of the second song and a beginning portion of the new song to generate a seamless transition between the second song and the newly added song.

At 108, process 100 can receive a request from a user device to present the sequence of songs in the playlist. In some embodiments, process 100 can receive the request from the user device in any suitable manner. For example, in some embodiments, process 100 can receive an indication that an icon or link associated with the playlist has been selected via a user interface presented on the user device.

At 110, process 100 can cause the modified songs of the modified version of the playlist to be presented by the user device in response to receiving the request. In some embodiments, process 100 can transmit the modified songs of the modified version of the playlist to be presented by the user device in any suitable manner. For example, in some embodiments, process 100 can stream the modified songs to the user device in any suitable manner and using any suitable technique(s). As another example, in some embodiments, process 100 can allow the songs included in the playlist to be downloaded to the user device for storage on the user device and presentation by the user device. Note that, in some embodiments, process 100 can transmit an indication of an overlap duration for each transition between successive modified songs in the modified version of the playlist that indicates a time when two successive modified songs are to be overlapped during presentation of the modified version of the playlist.

In some embodiments, the user device can present the modified songs of the modified version of the playlist to be presented in any suitable manner. For example, in some embodiments, the user device can cause a first song of the playlist to begin presentation. Continuing with this example, in some embodiments, the user device can identify an overlap duration during which the end of the first song is to be played concurrently with a beginning portion of the next song in the playlist. Continuing further with this example, in some embodiments, the user device can begin presentation of the next song in the playlist in response to determining that the overlap duration remains in playback of the first song, and can play the remainder of the first song concurrently with the beginning portion of the second song. Note that, in some embodiments, the user device can present the modified songs of the modified version of the playlist using any suitable media content player that includes any suitable controls to adjust playback of the modified songs (e.g., rewind a playback position, fast-forward a playback position, replay a song, adjust a volume, and/or any other suitable controls).

Figure 2:
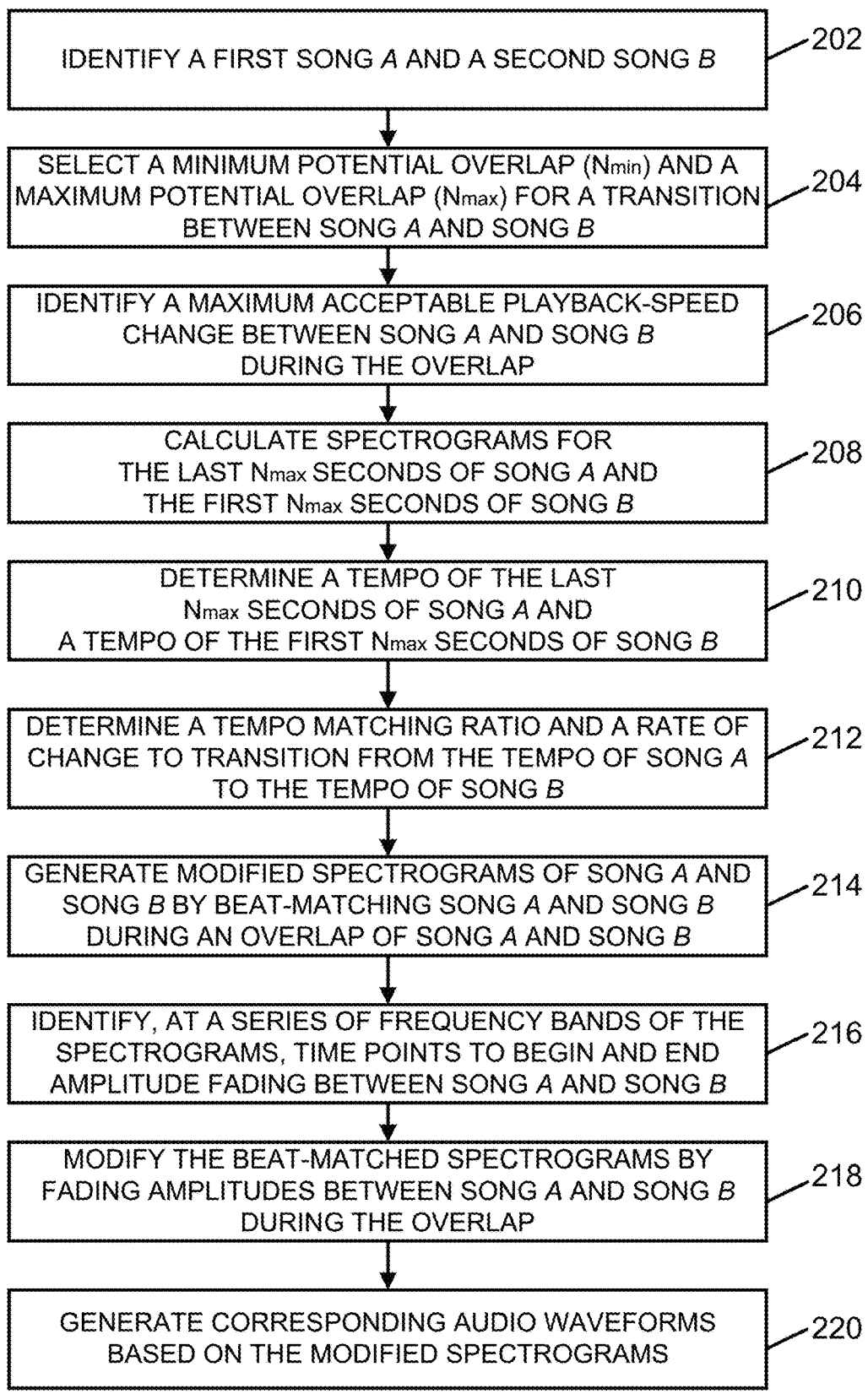
FIG. 2 shows an illustrative example of a process for generating a transition between two audio items in accordance with some embodiments of the disclosed subject matter.

Turning to FIG. 2, an illustrative example 200 of a process for generating a transition between the two songs is shown in accordance with some embodiments of the disclosed subject matter. In some embodiments, blocks of process 200 can be executed by any suitable device. For example, in some embodiments, blocks of process 200 can be executed by a server that stores and/or provides media content to user devices. As a more particular example, in some embodiments, process 200 can be executed by a server that stores playlists of songs, and the server can execute the blocks of process 200 to modify transitions between songs included in the playlists of songs.

Process 200 can begin at 202 by identifying a first song A and a second song B. In some embodiments, process 200 can identify the first song A and the second song B in any suitable manner. For example, in some embodiments, process 200 can be a process that iterates through songs in a playlist and can select songs A and B that correspond to a next pair of songs included in the playlist during iteration through the songs in the playlist. Note that, in some embodiments, each of song A and song B can have any suitable duration (e.g., ten seconds, thirty seconds, one minute, three minutes, five minutes, and/or any other suitable duration).

At 204, in some embodiments, process 200 can select a minimum potential overlap duration $N_{min}$ and a maximum potential overlap duration $N_{max}$ for a transition between song A and song B. Note that, as described above in connection with FIG. 1, in some embodiments, an overlap duration can indicate a duration of an end portion of song A (the song that is coming to an end) and a duration of a beginning portion of song B (the song that is about to begin) that are to be played concurrently during a transition from song A to song B. In some such embodiments, the minimum potential overlap duration $N_{min}$ can indicate a shortest potential overlap duration, and the maximum potential overlap duration $N_{max}$ can indicate a longest potential overlap duration. Note that, in some embodiments, an overlap duration $N_{overlap}$ between $N_{min}$ and $N_{max}$ can be selected by process 200 as described below in connection with 214.

In some embodiments, $N_{min}$ and $N_{max}$ can correspond to any suitable durations, where $N_{min}$ is less than $N_{max}$. For example, in some embodiments, potential overlap durations can include three seconds, five seconds, ten seconds, twenty seconds, and/or any other suitable duration. In some embodiments, process 200 can select $N_{min}$ and $N_{max}$ in any suitable manner. For example, in some embodiments, $N_{min}$ and $N_{max}$ can be selected based on durations of song A and song B. As a more particular example, in some embodiments, process 200 can select relatively larger values for $N_{min}$ and $N_{max}$ in instances in which durations of song A and/or song B are relatively long (e.g., in instances in which song A and song B are extended versions, and/or any other suitable relatively long versions). As another more particular example, in some embodiments, process 200 can select relatively smaller values for $N_{min}$ and $N_{max}$ in instances in which durations of song A and/or song B are relatively shorter and/or of a standard length.

It should be noted that, in some embodiments, process 200 can trim silences from the end portion of song A and/or the beginning portion of song B, thereby resulting in silence-trimmed portions of song A and song B. It should also be noted that process 200 can perform this silence trimming prior to selecting an overlap duration and prior to tempo estimation and alignment described hereinbelow. For example, after obtaining silence-trimmed portions of song A and/or song B, process 200 can compute spectrograms on the last 40 seconds of song A and first 40 seconds of song B.

At 206, process 200 can select a maximum acceptable playback-speed change between song A and song B during the overlap of song A and song B. In some embodiments, the maximum acceptable playback-speed change can indicate a maximum amount that the playback speeds of song A during the end portion of song A and song B during the beginning portion of song B can be changed in order to match their rhythms. In some embodiments, the maximum acceptable playback-speed change can correspond to any suitable percentage (e.g., 2%, 5%, 8%, 10%, and/or any other suitable percentage).

At 208, process 200 can calculate spectrograms for the last $N_{max}$ seconds of song A and the first $N_{max}$ seconds of song B. In some embodiments, process 200 can calculate the spectrograms in any suitable manner and using any suitable technique(s). For example, in some embodiments, process 200 can calculate the spectrograms using slices of any suitable duration (e.g., 30 milliseconds, 50 milliseconds, 70 milliseconds, and/or any other suitable duration). In a more particular example, process 200 can calculate the spectrogram using a frame length of 50 milliseconds by a Hanning window with a factor of four overlap (that is, a 12.5 millisecond step between frames). The Fast Fourier Transform (FFT) size that is used can be the next power of two greater than twice the frame length. For example, using a sample rate of 16,000 samples per second, the FFT size can be set to 2,048. If the underlying audio rate is greater than 16,000 samples per second, a full bandwidth transform can be done to generate spectrograms for using during the inversion process.

As another example, in some embodiments, process 200 can calculate the spectrograms with any suitable percentage overlap between slices (e.g., 50% overlap, 75% overlap, 80% overlap, and/or any other suitable percentage overlap). In some embodiments, process 200 can calculate the spectrograms using any suitable technique or combination of techniques, such as by using a Short-Time Fourier Transform (STFT), and/or in any other suitable manner. Note that, in some embodiments, parameters for calculating the spectrograms can be selected such that beat positions of beats in each of song A and song B are identifiable in the resulting spectrograms.

At 210, process 200 can determine a tempo of the last $N_{max}$ seconds of song A (e.g., the end portion of song A) and a tempo of the first $N_{max}$ seconds of song B (e.g., the beginning portion of song B). This tempo determination can be done so that process 200 can, for example, match beats during segment alignment.

In some embodiments, process 200 can determine the tempo in any suitable manner. For example, in some embodiments, process 200 can calculate the tempo of the last $N_{max}$ seconds of song A by calculating an autocorrelation of the spectrogram of the last $N_{max}$ seconds of song A and can calculate the tempo of the first $N_{max}$ seconds of song B by calculating an autocorrelation of the spectrogram of the first $N_{max}$ seconds of song B. In some embodiments, process 200 can calculate the tempo from the autocorrelation of the spectrogram in any suitable manner.

For example, in some embodiments, process 200 can calculate a periodicity in the autocorrelation of the spectrogram as the tempo. In some embodiments, process 200 can calculate an autocorrelation for different frequencies of the spectrogram. In some such embodiments, process 200 can then calculate a mean autocorrelation by calculating a mean of the autocorrelations of the different frequencies of the spectrogram. Continuing with this example, in some embodiments, process 200 can calculate the tempo by calculating a periodicity within the mean autocorrelation.

Note that, in some embodiments, rather than calculating the tempo of the last $N_{max}$ seconds of song A and the tempo of the first $N_{max}$ seconds of song B using the last $N_{max}$ seconds of the spectrogram of song A and the first $N_{max}$ seconds of the spectrogram of song B, respectively, in some embodiments, process 200 can calculate the tempo of the last $N_{max}$ seconds of song A and the tempo of the first $N_{max}$ seconds of song B by calculating an autocorrelation of the last $N_{max}$ seconds of the time-domain audio signal of song A and the first $N_{max}$ seconds of the time-domain audio signal of song B, respectively.

In some embodiments, process 200 can analyze the last $N_{max}$ seconds of song A and the first $N_{max}$ seconds of song B to determine a list of candidate tempos. For example, to estimate tempo, process 200 can begin with the correlation coefficient for each segment lag, $\rho[l]$, and can compute a sub-harmonically reinforced, differential tempo measure, $t[l]$, from $\rho[l]$, which can be represented as:

$$t[l] = \frac{1}{N_l} \sum_{i=1}^{N_l} \rho[il] - (m_\rho[i-1, l] + m_\rho[i, l])/2$$

$$m_\rho[j, l] = \min_{k=jl+1}^{(j+1)l-1} \rho[k]$$

It should be noted that the tempo measure is locally differential as it uses the strength difference in $\rho[il]$ at the i-th sub-harmonic of l and the minimum values of $\rho$ within one period on either side, thereby reducing the main lobe effect seen in the autocorrelation function and suppressing halved tempos. When there is a consistent tempo, this differential tempo measure can bring the tempo peaks into sharp relief as shown, for example, in FIG. 3. With this differential measure, 0.25 can be considered to correspond to a strong beat and below 0.01 can be considered to correspond to a weak or inconsistent tempo. Accordingly, for each of the tempo curves corresponding to the last $N_{max}$ seconds of song A (e.g., the end portion of song A) and a tempo of the first $N_{max}$ seconds of song B (e.g., the beginning portion of song B), process 200 can determine the lags and strength of the peaks that are above 0.01 and above both of its closest neighbor lags.

Figure 3:
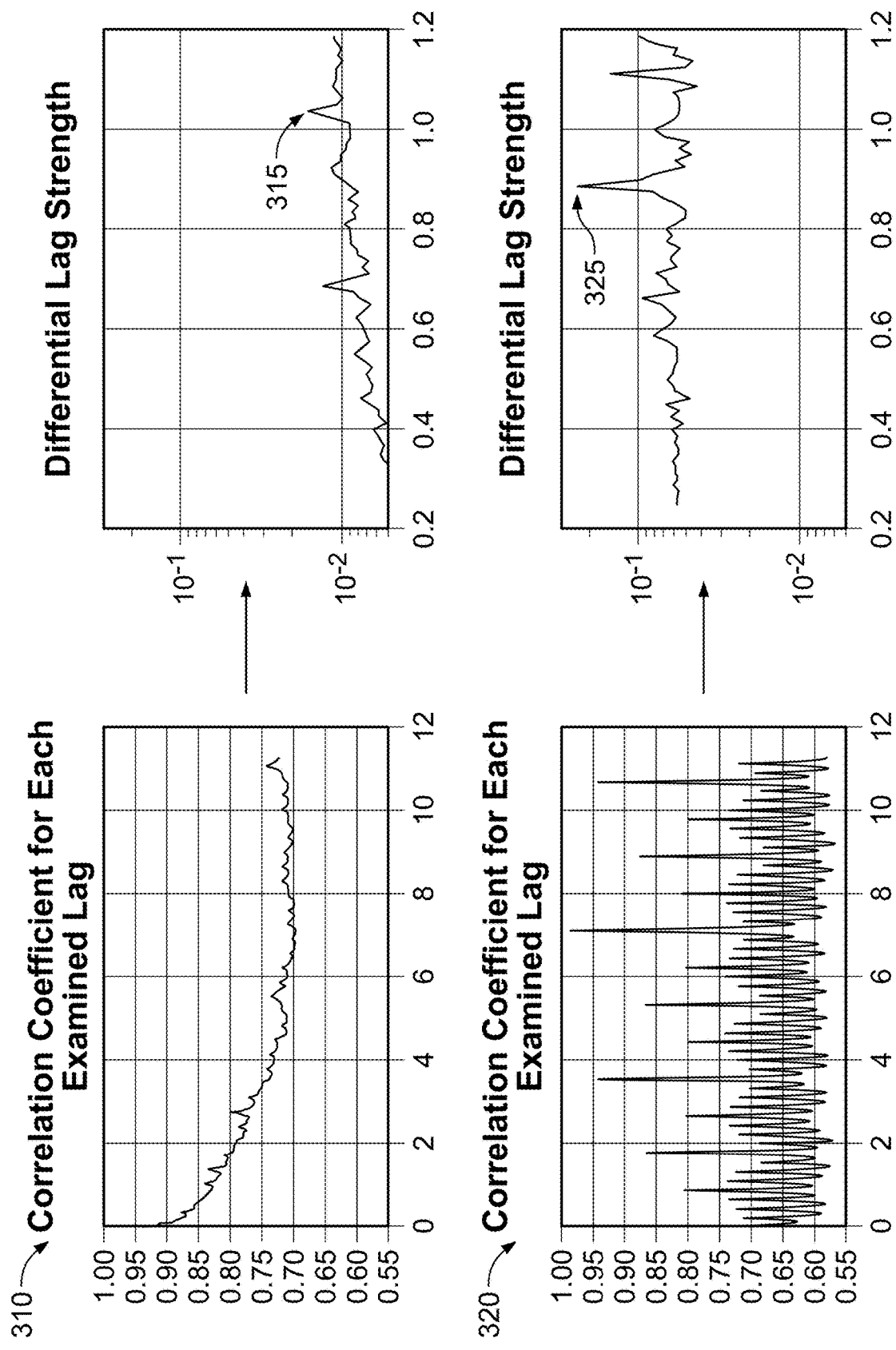
FIG. 3 shows illustrative examples of correlation coefficients and tempo measure curves for a current audio item segment and a next audio item segment in accordance with some embodiments of the disclosed subject matter.

Turning to FIG. 3, an ending portion of a current song 310 is determined to have a weak tempo of 0.016 using the differential tempo measure that is most prominent at 1.04 seconds per beat (as shown by an indicator 315). As also shown in FIG. 3, the ending portion of the current song 310 is also determined to have two weaker alternative tempos at 0.069 seconds per beat and 0.093 seconds per beat. For a beginning portion of a next song 320, the next song 320 is determined to have a stronger tempo of 0.25 using the differential tempo measure that is most prominent at 0.89 seconds per beat (as shown by an indicator 325).

Turning back to FIG. 2, at 212, process 200 can use the estimated tempos of the end portion of the current song (sometimes referred to as the current segment) and the beginning portion of the next song (sometimes referred to as the next segment) to resample the corresponding spectrograms such that the tempos are brought into alignment while minimizing the probable audibility of the tempo change. For example, as shown in FIG. 2, this can include determining a tempo matching ratio and a rate of tempo change to transition from the tempo of the last $N_{max}$ seconds of song A to the tempo of the first $N_{max}$ seconds of song B. In some embodiments, the tempo matching ratio can indicate a ratio at which beats of song A are aligned to beats of song B during the overlap between song A and song B (e.g., when the end portion of song A is played concurrently with the beginning portion of song B). In some embodiments, the rate of tempo change can indicate a rate at which tempos of songs A and B are to be adjusted during the overlap.

Note that, in some embodiments, process 200 can first determine whether a difference between the tempo of the last $N_{max}$ seconds of song A and the tempo of the first $N_{max}$ seconds of song B is within the maximum acceptable tempo difference identified at 206. For example, in an instance in which the tempo of the last $N_{max}$ seconds of song A is calculated as 1.06 seconds per beat, the tempo of the first $N_{max}$ seconds of song B is calculated as 1.05 seconds per beat, and the maximum acceptable tempo difference is 5%, process 200 can determine that the difference in tempos is within the maximum acceptable tempo difference. In some such embodiments, in an instance in which process 200 determines that the tempo of the last $N_{max}$ seconds of song A and the tempo of the first $N_{max}$ seconds of song B is within the maximum acceptable tempo difference, process 200 can determine that the tempos of song A and song B do not have to be adjusted, and the beats of the last $N_{max}$ seconds of song A and the first $N_{max}$ seconds of song B can be matched at a 1:1 ratio.

Conversely, in an instance in which process 200 determines that the tempo of the last $N_{max}$ seconds of song A and the tempo of the first $N_{max}$ seconds of song B are not within the maximum acceptable tempo difference identified at 206, process 200 can calculate the tempo matching ratio and the rate of tempo change by which the tempo of the last $N_{max}$ seconds of song A is to be adjusted such that beats of the last $N_{max}$ seconds of song A are aligned with beats of the first $N_{max}$ seconds of song B.

In some embodiments, process 200 can calculate the tempo matching ratio in any suitable manner. For example, in some embodiments, process 200 can calculate a lowest rational fraction that will match the tempo of the last $N_{max}$ seconds of song A to the tempo of the first $N_{max}$ seconds of song B within the maximum acceptable tempo difference identified at 206. As a more particular example, in an instance in which the tempo of the last $N_{max}$ seconds of song A is 1.06 seconds per beat, and the tempo of the first $N_{max}$ seconds of song B is 0.68 seconds per beat, process 200 can calculate a ratio of the tempos as 0.68/1.06 or 0.6415. Continuing with this example, process 200 can determine that the lowest rational fraction closest to 0.6415 is $2/3 \approx 0.6667$. In some embodiments, process 200 can then calculate the rate of tempo change based on the ratio of the tempos and the calculated lowest rational fraction. For example, in some embodiments, process 200 can calculate the rate of tempo change as the percentage difference between the calculated ratio of the tempos and the value of the lowest rational fraction closest to the ratio of the tempos. Continuing with the example given above, in some embodiments, process 200 can calculate the rate of tempo change as $$\frac{0.6667 - 0.6415}{0.6415} = 0.0392\%.$$

At 214, process 200 can generate modified spectrograms of song A and song B by beat-matching song A and song B during the overlap of song A and song B. In some embodiments, process 200 can beat-match the transition between song A and song B in any suitable manner. For example, in some embodiments, process 200 can determine an overlap duration, $N_{overlap}$, of song A and song B ranging from $N_{min}$ to $N_{max}$ where the spectrograms of song A and song B are most closely matched. In some embodiments, process 200 can identify the overlap in any suitable manner. For example, in some embodiments, process 200 can generate a correlation matrix to identify a maximum match in the spectrograms of song A and song B between $N_{min}$ and $N_{max}$.

In some embodiments, to avoid biasing selection of the overlap toward $N_{max}$, process 200 can normalize each offset of the correlation matrix by the power of either song A or song B in the region that is being overlapped. Note that, in some embodiments, beats of the last $N_{overlap}$ seconds of song A can be aligned with beats of the first $N_{overlap}$ seconds of song B at the tempo matching ratio calculated at 212. For example, in an instance in which a lowest rational fraction was calculated at 212, the beats can be aligned at the rational fraction ratio calculated at 212.

Note that in instances in which process 200 determined at 212 that the tempos of song A and song B are to be adjusted, process 200 can tempo-warp the last $N_{max}$ seconds of song A and/or can tempo-warp the first $N_{max}$ seconds of song B. In some embodiments, process 200 can tempo-warp song A and/or song B in any suitable manner. For example, in some embodiments, process 200 can interpolate frames of the spectrogram during the first $N_{max}$ seconds of song B to apply the tempo change calculated at 212. In some embodiments, process 200 can then gradually shift to apply the tempo change to the last $N_{max}$ seconds of song A. Note that, in some embodiments, process 200 can adjust the tempos of song A and song B prior to determining $N_{overlap}$, as described above.

In a more particular example of tempo alignment, process 200 can use these two sets of candidate tempos and strengths for the current segment ($\{T_C[k]\}$ and $\{S_C[k]\}$) and the next segment ($\{T_N[k]\}$ and $\{S_N[k]\}$) to determine how to change the speeds of the segments to allow for beat alignment.

More particularly, in some embodiments, process 200 can determine, across all of the pairs of ($\{T_C[k_C]\}$ and $\{T_N[k_C]\}$), the pair that provides the strongest combined strength, $S[k_C, k_N] = S_C[k_C] + S_N[k_N]$, with the least noticeable speed change, $$\gamma[k_C, k_N] = \frac{T_C[k_C]}{T_N[k_N]} - 1.$$

That is, process 200 can resample the current and next spectrograms to bring the two tempos into alignment using a speed profile that can minimize or reduce the probable audibility of the speed change. In continuing this example, process 200 can collect all of the ($k_C$, $k_N$) pairings which provide a $\gamma$ within a user-specified allowed range (e.g., −15% through 25%) and can penalize the combined strength by the perceptible speed change:

$$S[k_C, k_N] \times (1 - \max(0, \gamma[k_C, k_N] - \gamma_{thres}))$$

where $\gamma_{thres}$ is, for example, 5%. Using this, process 200 can determine a speed change, $\gamma$, and the maximum strengths of the tempo peaks in each song, $S_{\gamma,C} = \max\{S_C\}$ and $S_{\gamma,N} = \max\{S_N\}$.

In some embodiments, to match the tempos using this pairing, process 200 can play the current segment at $\gamma+1$ of the speed of the next segment. The maximum strengths of the tempo peaks in each song can be used to determine the profile for that speed change over the course of the overlapping sections. To bias the transition to maintain the segment with a stronger beat at its natural speed for a longer interval, process 200 can generate a speed profile.

Figure 4:
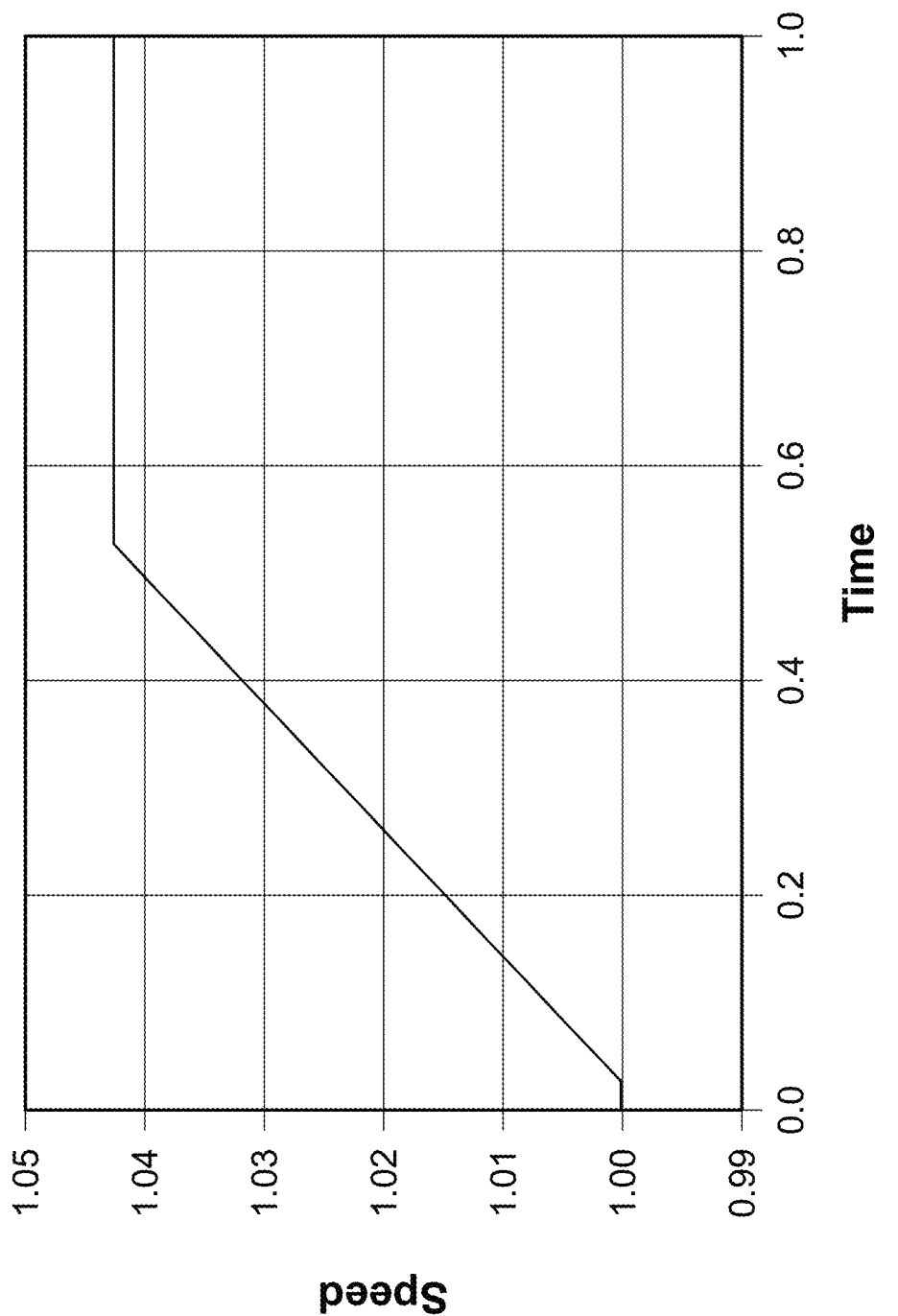
FIG. 4 shows an illustrative example of a playback speed profile for transitioning between a current audio item segment and a next audio item segment in accordance with some embodiments of the disclosed subject matter.

An illustrative example of a speed profile is shown in FIG. 4. Continuing the example from FIG. 3, process 200 can generate a speed profile that increases the playback speed from the weak-tempo segment to the strong-tempo segment, where the playback speed changes during the weak-tempo portion. More particularly, since the next segment has a stronger tempo of 0.25 than the current segment, which has a tempo of 0.016, changes to the playback speed in the strong-tempo portion may be more audible than changes to playback speed in the weak-tempo portion.

In continuing this example, process 200 can use $S_{\gamma,C}$ and $S_{\gamma,N}$ in determining the relative lengths of constant speed sections, $R_C$ and $R_N$, which can be represented as:

$$R_{C,max} = 0.5 * \frac{S_{\gamma,C}}{S_{max}} \quad R_{N,max} = 0.5 * \frac{S_{\gamma,N}}{S_{max}}$$

$$R_C = \max\left(0, \min\left(R_{C,max} - \epsilon, \frac{0.5 * R_{C,max}}{R_{C,max} + R_{N,max}}\right)\right)$$

$$R_N = \max\left(0, \min\left(R_{N,max} - \epsilon, \frac{0.5 * R_{N,max}}{R_{C,max} + R_{N,max}}\right)\right)$$

$$\epsilon = 0.5 * \frac{S_{min}}{S_{max}}$$

It should be noted that $R_C$ and $R_N$ are the fraction of the overlapping section that is played back at the current segment's natural speed and the next segment's natural speed. As shown in FIG. 4, process 200 can linearly change speed for the remaining $1-R_C-R_N$ fraction of the overlap.

It should also be noted that this set of constraints on speed, along with $L_{F,C}$, the natural overlap duration on the current segment, can determine the (re-sampled) tempo-aligned duration, $L_F$, which can be represented as:

$$L_F = \text{round}\left(\frac{L_{F,C}}{(1.0 + 0.5 * \gamma * (1.0 + R_N - R_C))}\right)$$

With the number of samples on the target speed profile of FIG. 4, the natural-speed duration in the current segment is $L_{F,C}$ and the natural-speed duration in the next segment is $$L_{F,N} = \frac{L_{F,C}}{1+\gamma}.$$

In continuing this example, process 200 can form a time-dependent dot product matrix, showing the spectral product of the current and next segments at those current-segment and next-segment natural times. To enforce 1+γ relative speeds, process 200 can integrate the dot product matrix on lines with a 1+γ slope and with an intercept determined by the offset time between the current segment and the next segment. On that line, process 200 can sample the integral using the sampling profile shown in FIG. 4. The sample spacing is one unit on the vertical axis (current-segment-time) when the playback speed is the current segment's natural speed and the sample spacing is one unit on the horizontal axis (next-segment-time) when the playback speed is the next segment's natural speed with intermediate spacing for intermediate speeds.

It should be noted that, as the dot product matrix is being computed on products of spectral amplitudes, process 200 can normalize the line-integral value by the separate power profiles of the resampled overlapping sections, thereby providing a correlation-coefficient measure. Using this approach, process 200 can find the offset with the strongest correlation coefficient. This offset and the sampling profiles can be used to generate two underlying tempo-aligned, offset-aligned sections for seamless audio melding.

Referring back to FIG. 2, at 216, process 200 can identify, at a series of frequency bands of the spectrograms, time points to begin and end amplitude fading during the transition from song A to song B. In some embodiments, the series of frequency bands can include any suitable number of bands (e.g., 8, 16, 32, and/or any other suitable number of bands). In some embodiments, bands in the series of bands can be logarithmically-sized. Note that, in some such embodiments, there can be a minimum number of frequency channels (e.g., four channels, and/or any other suitable minimum) for the lower bands. For example, in an instance in which the spectrograms are 1025-wide, and in which 16 bands are to be constructed, process 200 can construct a series of frequency bands, where the top frequency bin for each band are: [4, 8, 12, 16, 20, 24, 28, 32, 49, 76, 117, 181, 279, 439, 665, 1025].

In some embodiments, process 200 can identify the time points to begin and end amplitude fading for each frequency band in the series of frequency bands in any suitable manner. For example, in some embodiments, starting with the lowest frequency band (e.g., frequency bins 0-3 in the example frequency bands given above), process 200 can find the region of the spectrogram within the lowest frequency band of the last $N_{overlap}$ seconds of song A and the first $N_{overlap}$ seconds of song B with a high cross-correlation. That is, process 200 can determine a quality of each possible beginning time point and end time point by examining the local texture alignment, where, if the two underlying textures between the start-end points are similar, the quality of that pair can be given a high cross-correlation score and where, if the two underlying textures between the start-end points are dissimilar, the quality of that pair can be given a relatively lower cross-correlation score. In some embodiments, the window and position identified as yielding a high cross-correlation can be used to define the beginning time point and the ending time point for the amplitude fade for the lowest frequency band. In some embodiments, process 200 can then move to the next higher frequency band (e.g., 5 Hz-8 Hz in the example frequency bands given above), and can similarly identify the window with the highest cross-correlation within the next higher frequency band. Note that, in some embodiments, process 200 can constrain the cross-correlation length to be the same length or a shorter length than the length of the window identified for the lowest frequency band and to overlap with more than a predetermined amount with the window identified for the lowest frequency band (e.g., overlap by more than a predetermined duration of time, overlap by more than a predetermined percentage, and/or overlap by any other suitable amount). In some embodiments, process 200 can continue similarly with all of the frequency bands in the series of frequency bands. Note that, in some embodiments, windows for amplitude fading at the highest frequency bands can be relatively shorter than windows for amplitude fading at the lowest frequency bands, thereby producing shorter cross-fades at higher frequency bands.

Figure 5:
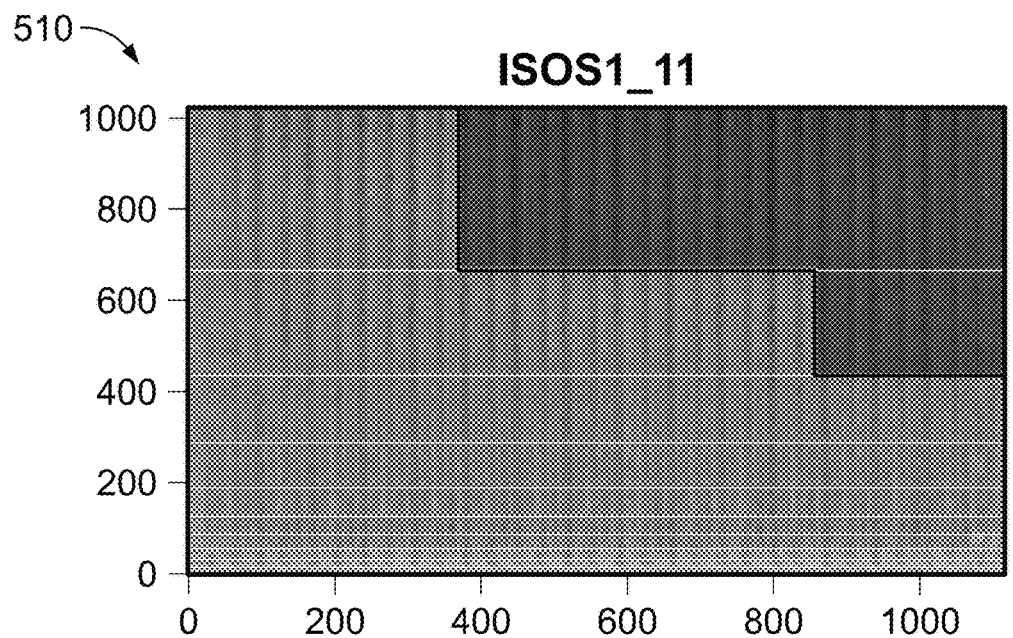
FIG. 5 shows an illustrative example of carving of aligned spectrograms in which aligned spectral sections of a current audio item segment and a next audio item segment are overlapped and in which a masked portion is used to meld the aligned spectral sections of the current audio item segment and the next audio item segment in accordance with some embodiments of the disclosed subject matter.
Figure 5:
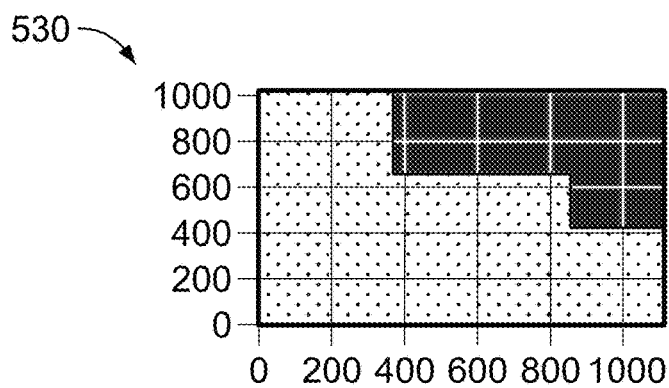
Figure 5:
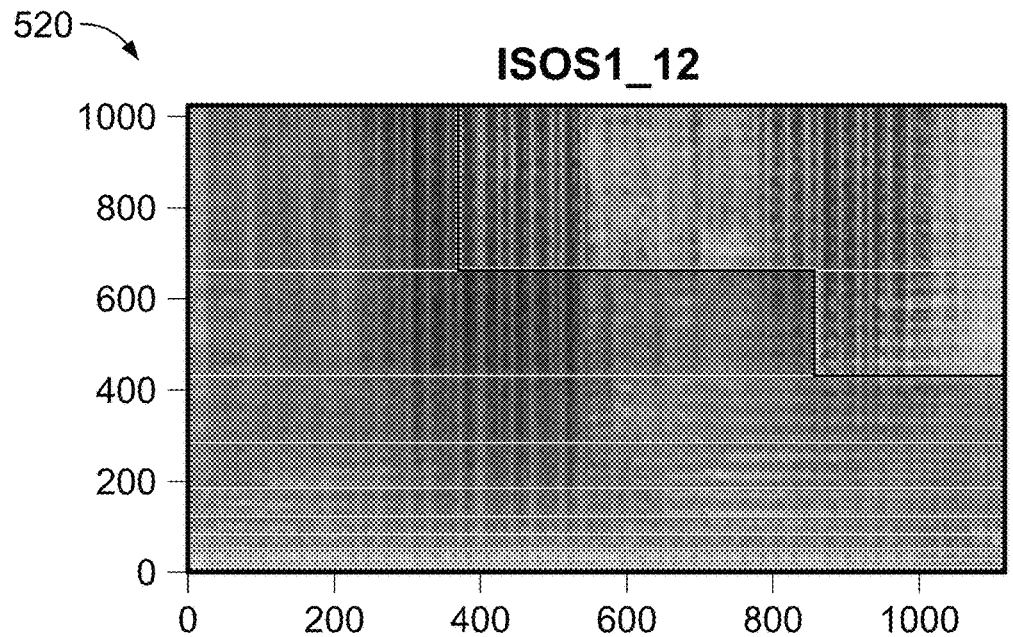
Figure 6A:
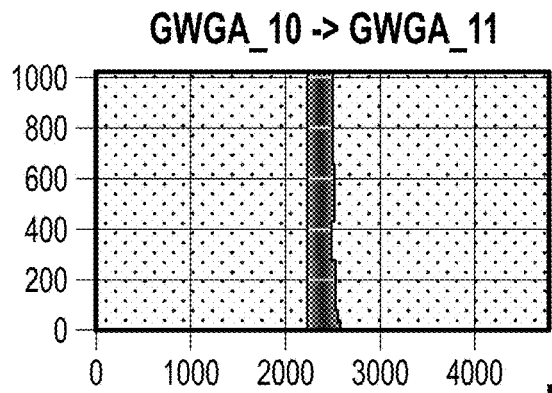
FIGS. 6A-6D show illustrative examples of meld transitions between two audio items in accordance with some embodiments of the disclosed subject matter.
Figure 6A:
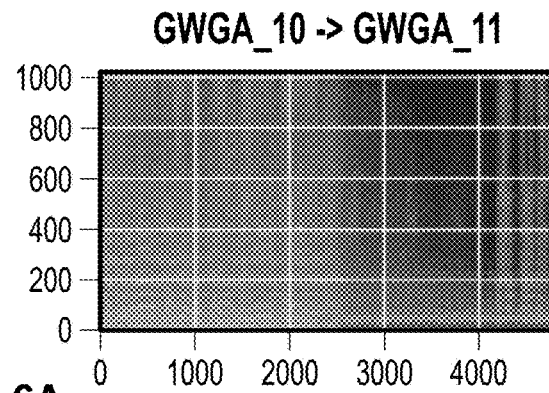
Figure 6B:
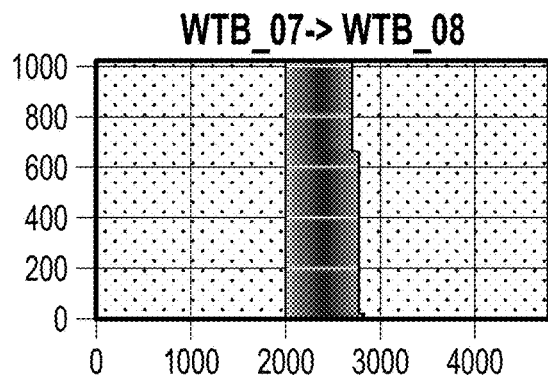
Figure 6B:
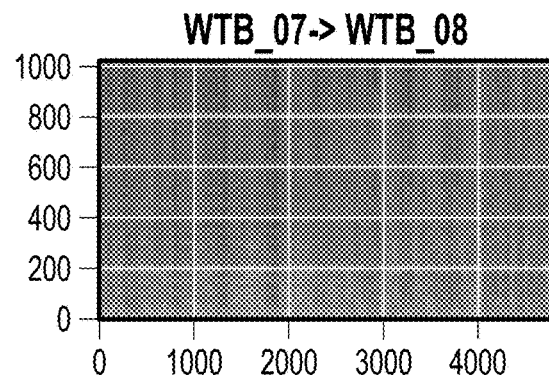
Figure 6C:
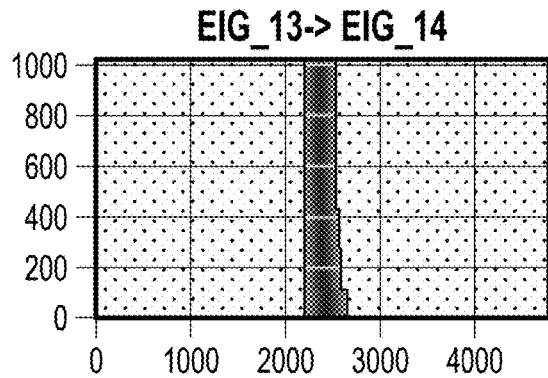
Figure 6C:
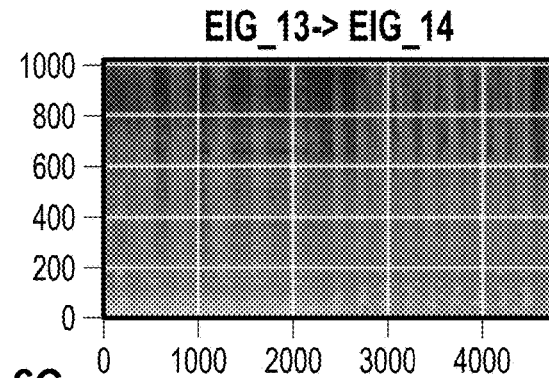
Figure 6D:
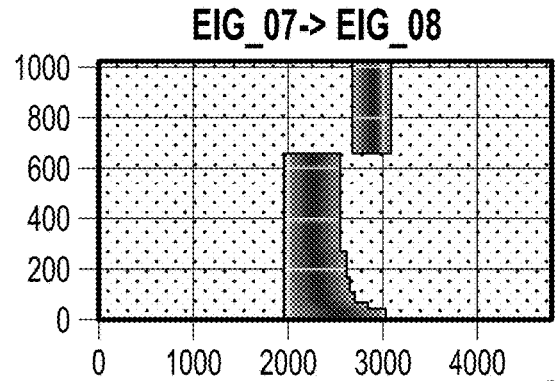
Figure 6D:
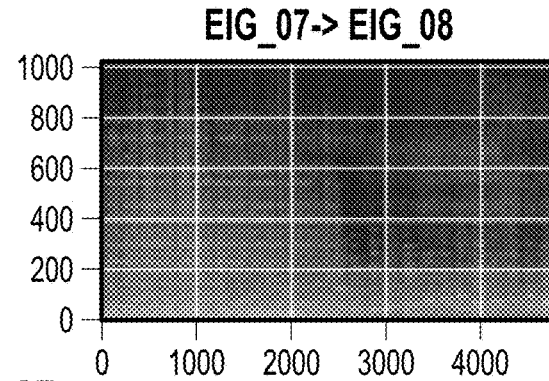

An illustrative mask that combines start-end points across the frequency bands is shown in FIG. 5 in accordance with some embodiments of the disclosed subject matter, where the illustrative mask can be used to meld two aligned spectral sections of the ending portion of song A and the beginning portion of song B. As described above, using dynamic programming, process 200 can determine an optimal path for the start-end points in the mask based on the quality of the energy match within each frequency region. For example, the left edge of the meld is the earliest overlap slice and the right edge for the bottom 14 spectral regions is at the latest overlap slice. For the top two regions, the end of the cross-face moves closer to its start. Having found these optimal start and end points, process 200 can linearly fade the spectrograms between them.

It should be noted that, beyond the mask shown in FIG. 5, the melded spectrogram can be identical to the spectrogram of the current song (e.g., song A) and the spectrogram of the next song (e.g., song B).

It should also be noted that, in some embodiments, process 200 can include a transition penalty to discourage drift in the midpoint of the cross face and lengthening of cross fades at higher frequencies. For example, a penalty can be assigned to position changes in the start-end times that either lengthen the distance between those points relative to the previous (lower-frequency) band or that change the center of the cross-fade relative to its position in the previous (lower-frequency) band.

It should further be noted that, although FIG. 5 shows that the frequency bands are grouped in a mel-scale-like spacing in which there are 16 spectral bands, this is merely illustrative.

At 218, process 200 can modify the beat-matched spectrograms by amplitude fading amplitudes of song A and song B based on the amplitude-fading windows identified at 216, as described above. In some embodiments, process 200 can modify the beat-matched spectrograms in any suitable manner. For example, in some embodiments, process 200 can merge the beat-matched spectrograms by performing a weighted time-average of the spectrograms corresponding to song A and song B within each frequency band in the series of frequency bands. As a more particular example, in some embodiments, in an instance in which the time points identified at 216 indicate that an amplitude fade for the frequency bins 0-3 is to be performed from time points of 3:00-3:15, process 200 can average the spectrograms of song A and song B within the time points of 3:00-3:15 such that song A contributes 100% of the amplitude at 3:00 and song B contributes 100% of the amplitude at 3:15. In some embodiments, the percentage amplitude contribution of each song during the amplitude-fading window can follow any suitable function, such as a linear function, and/or any other suitable function.

Illustrative examples of meld transitions between two songs are shown in FIGS. 6A-6D. For example, FIG. 6A has an overlapping length of 5 seconds, a speed change of a 4.1% increase, and a tempo strength of 0.031 and 0.032 between two songs, FIG. 6B has an overlapping length of 11.67 seconds, a speed change of a 4.8% increase, and a tempo strength of 0.028 and 0.22 between two songs, FIG. 6C has an overlapping length of 7.11 seconds, a speed change of 17.3% increase and a tempo strength of 0.009 and 0.029, and FIG. 6D has an overlapping length of 15 seconds, a speed change of a 2.2% increase, and a tempo strength of 0.029 and 0.010.

At 220, process 200 can generate modified audio waveforms for song A and song B based on the modified spectrograms. In some embodiments, process 200 can generate the modified audio waveforms in any suitable manner. For example, in some embodiments, process 200 can generate an audio waveform by estimating an audio signal from the modified spectrogram using an inverse STFT and/or in any other suitable manner.

In some embodiments, process 200 can use any suitable technique or combination of techniques to estimate phases of the modified audio waveform using the modified spectrogram. For example, in some embodiments, process 200 can use technique(s) similar to the Griffin-Lim technique for iteratively estimating phases of the audio waveform from the modified spectrogram. In some embodiments, process 200 can set initial estimates for phases in any suitable manner to reduce a number of iterations required to estimate the phases of the audio waveform. For example, in some embodiments, process 200 can set initial estimates for the phases as the phases of the original spectrograms for song A and song B for time points of the spectrogram not included in the overlap, and can set initial estimates for phases for time points included in the overlap as a spectral-magnitude-weighted average of the phases in the overlap.

Note that, in some embodiments, process 200 can generate the modified waveforms for song A and song B subject to any suitable constraints. For example, in some embodiments, process 200 can generate the modified waveforms for song A and song B such that magnitudes of a spectrogram generated by overlapping or superposing the modified waveform for song A and song B based on the overlap duration identified at 214 match magnitudes of the modified spectrogram from which the modified waveforms were generated in the overlap region. As another example, in some embodiments, process 200 can generate the modified waveforms for song A and song B such that phases of a spectrogram generated by overlapping or superposing the modified waveform for song A and song B based on the overlap duration identified at 214 match phases of song A at the beginning of the overlap region (e.g., an initial half of the overlap region, and/or any other suitable beginning of the overlap region) and match phases of song B and the end of the overlap region (e.g., a final half of the overlap region, and/or any other suitable final half of the overlap region).

Note that, in some embodiments, process 200 can store the generated modified audio waveforms corresponding to modified versions of song A and song B. For example, in some embodiments, process 200 can store the generated modified audio waveforms in connection with identifiers of song A and song B. As another example, in some embodiments, process 200 can store the generated modified audio waveform in connection with an indication of the overlap duration (e.g., $N_{overlap}$, as determined and described above in connection with 214) that indicates a duration of an end portion of the modified version of song A that is to be overlapped with a beginning portion of the modified version of song B.

Figure 7:
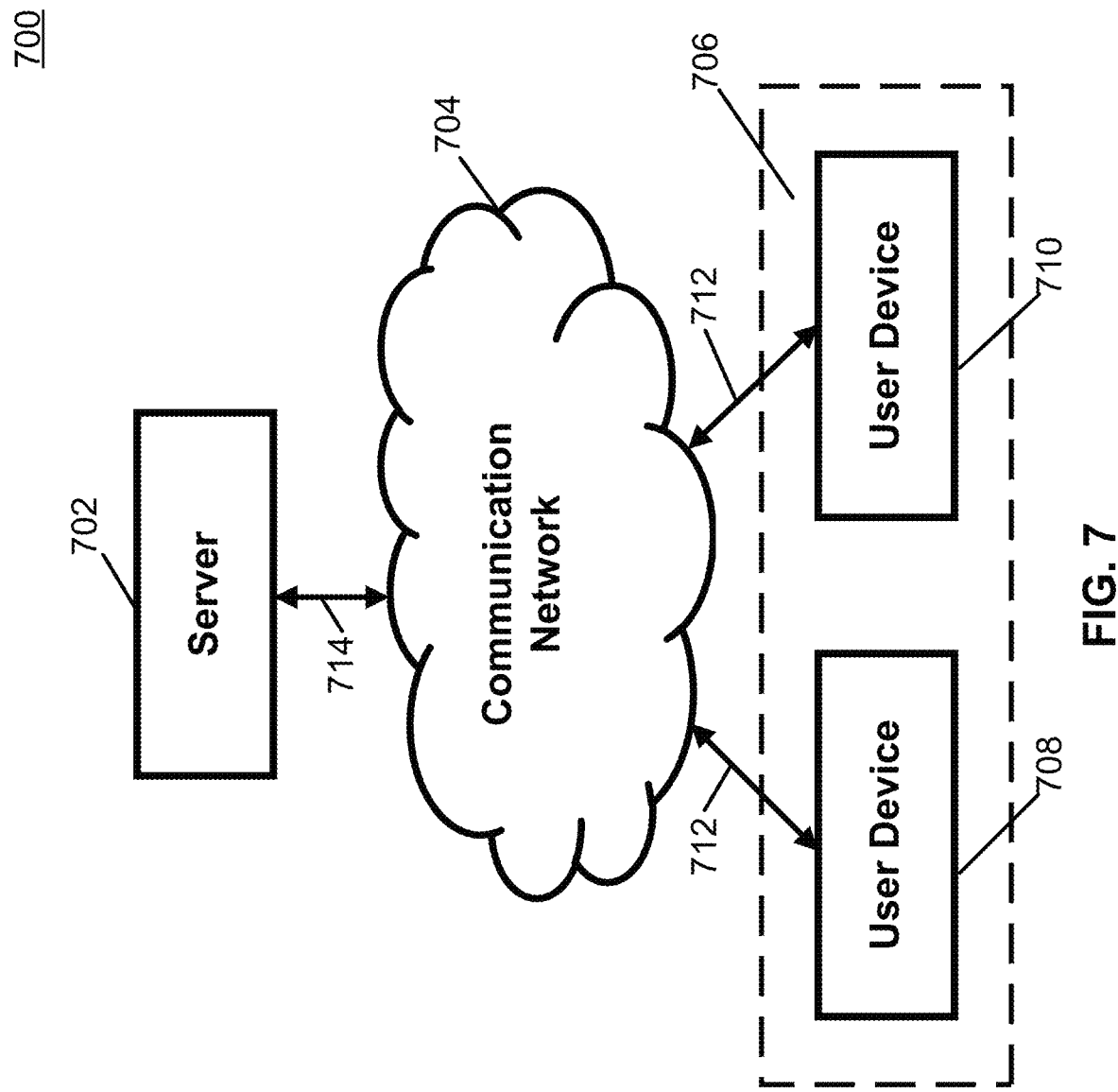
FIG. 7 shows a schematic diagram of an illustrative system suitable for implementation of mechanisms described herein for seamless audio melding between audio items in playlists in accordance with some embodiments of the disclosed subject matter.

Turning to FIG. 7, an illustrative example 700 of hardware for seamless audio melding between songs in playlists that can be used in accordance with some embodiments of the disclosed subject matter is shown. As illustrated, hardware 700 can include a server 702, a communication network 704, and/or one or more user devices 706, such as user devices 708 and 710.

Server 702 can be any suitable server(s) for storing information, data, programs, media content, and/or any other suitable content. In some embodiments, server 702 can perform any suitable function(s). For example, in some embodiments, server 702 can transmit a playlist of audio content items to a user device for presentation on the user device. As another example, in some embodiments, server 702 can modify an end portion of a first song and a beginning portion of a second song, such that the first song transitions smoothly to the second song when the end portion of the first song is overlapped with the beginning portion of the second song, as shown in and described below in connection with FIG. 2.

Communication network 704 can be any suitable combination of one or more wired and/or wireless networks in some embodiments. For example, communication network 704 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 706 can be connected by one or more communications links (e.g., communications links 712) to communication network 704 that can be linked via one or more communications links (e.g., communications links 714) to server 702. The communications links can be any communications links suitable for communicating data among user devices 706 and server 702 such as network links, dial-up links, wireless links, hard-wired links, any other suitable communications links, or any suitable combination of such links.

User devices 706 can include any one or more user devices suitable for playing audio content and/or a playlist of audio content. In some embodiments, user device 706 can include any suitable type of user device, such as mobile phones, tablet computers, wearable computers, laptop computers, desktop computers, smart televisions, media players, game consoles, vehicle information and/or entertainment systems, and/or any other suitable type of user device.

Although server 702 is illustrated as one device, the functions performed by server 702 can be performed using any suitable number of devices in some embodiments. For example, in some embodiments, multiple devices can be used to implement the functions performed by server 702.

Although two user devices 708 and 710 are shown in FIG. 7 to avoid over-complicating the figure, any suitable number of user devices, and/or any suitable types of user devices, can be used in some embodiments.

Figure 8:
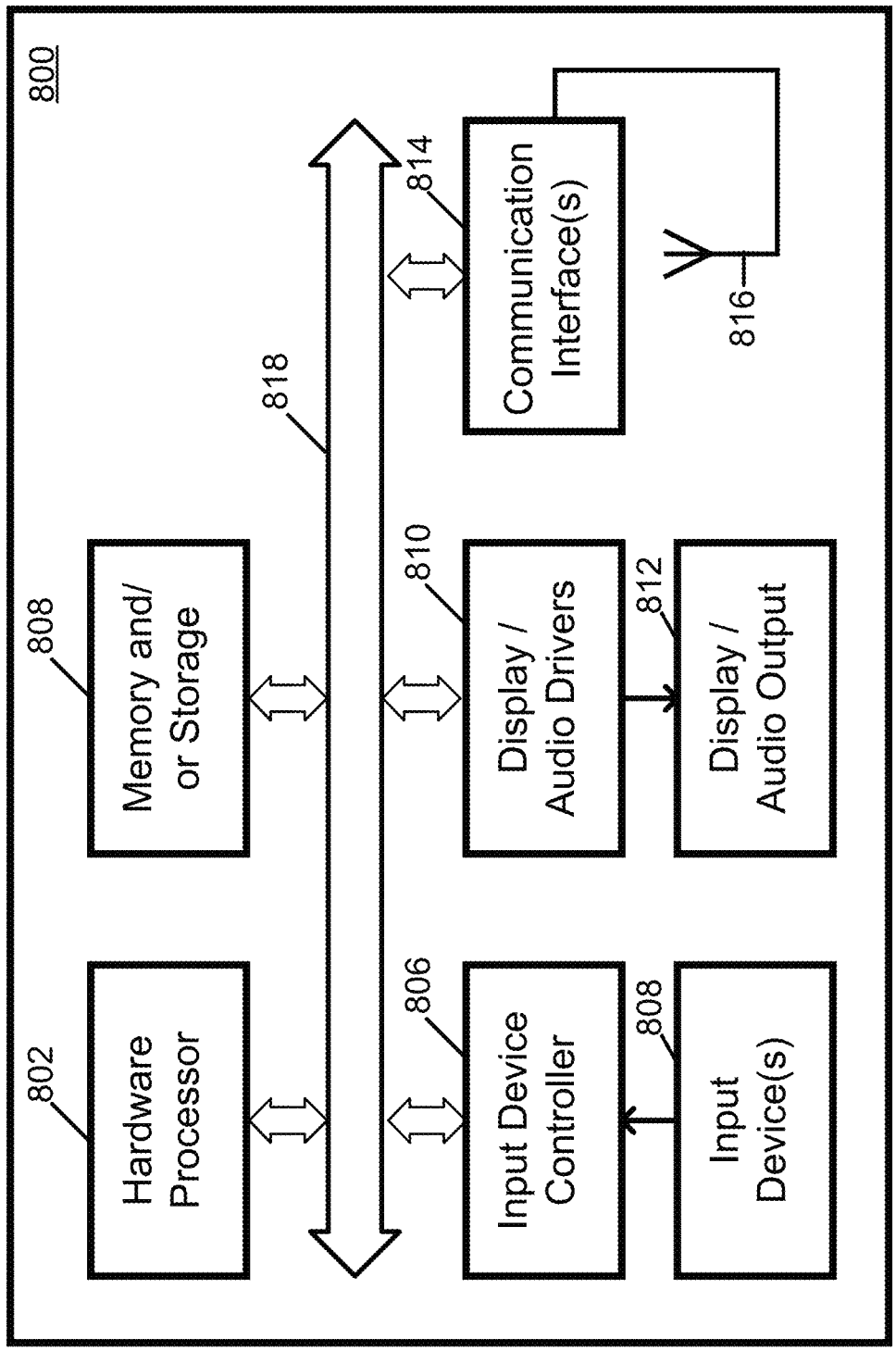
FIG. 8 shows a detailed example of hardware that can be used in a server and/or a user device of FIG. 7 in accordance with some embodiments of the disclosed subject matter.

Server 702 and user devices 706 can be implemented using any suitable hardware in some embodiments. For example, in some embodiments, devices 702 and 706 can be implemented using any suitable general-purpose computer or special-purpose computer. For example, a mobile phone may be implemented using a special-purpose computer. Any such general-purpose computer or special-purpose computer can include any suitable hardware. For example, as illustrated in example hardware 800 of FIG. 8, such hardware can include hardware processor 802, memory and/or storage 804, an input device controller 806, an input device 808, display/audio drivers 810, display and audio output circuitry 812, communication interface(s) 814, an antenna 816, and a bus 818.

Hardware processor 802 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 802 can be controlled by a server program stored in memory and/or storage of a server, such as server 702. In some embodiments, hardware processor 802 can be controlled by a computer program stored in memory and/or storage 804 of user device 706.

Memory and/or storage 804 can be any suitable memory and/or storage for storing programs, data, and/or any other suitable information in some embodiments. For example, memory and/or storage 804 can include random access memory, read-only memory, flash memory, hard disk storage, optical media, and/or any other suitable memory.

Input device controller 806 can be any suitable circuitry for controlling and receiving input from one or more input devices 808 in some embodiments. For example, input device controller 806 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 810 can be any suitable circuitry for controlling and driving output to one or more display/audio output devices 812 in some embodiments. For example, display/audio drivers 810 can be circuitry for driving a touchscreen, a flat-panel display, a cathode ray tube display, a projector, a speaker or speakers, and/or any other suitable display and/or presentation devices.

Communication interface(s) 814 can be any suitable circuitry for interfacing with one or more communication networks (e.g., computer network 704). For example, interface(s) 814 can include network interface card circuitry, wireless communication circuitry, and/or any other suitable type of communication network circuitry.

Antenna 816 can be any suitable one or more antennas for wirelessly communicating with a communication network (e.g., communication network 704) in some embodiments. In some embodiments, antenna 816 can be omitted.

Bus 818 can be any suitable mechanism for communicating between two or more components 802, 804, 806, 810, and 814 in some embodiments.

Any other suitable components can be included in hardware 800 in accordance with some embodiments.

In some embodiments, at least some of the above described blocks of the processes of FIGS. 1 and 2 can be executed or performed in any order or sequence not limited to the order and sequence shown in and described in connection with the figures. Also, some of the above blocks of FIGS. 1 and 2 can be executed or performed substantially simultaneously where appropriate or in parallel to reduce latency and processing times. Additionally or alternatively, some of the above described blocks of the processes of FIGS. 1 and 2 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for seamless audio melding between songs in playlists are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for transitioning between audio items in a playlist, the method comprising:
   identifying a first audio item and a second audio item that is to be played subsequent to the first audio item; and
   modifying an end portion of the first audio item and a beginning portion of the second audio item, wherein the end portion of the first audio item and the beginning portion of the second audio item are to be played concurrently to transition between the first audio item and the second audio item, wherein the end portion of the first audio item and the beginning portion of the second audio item have an overlap duration, and wherein modifying the end portion of the first audio item and the beginning portion of the second audio item comprises (i) identifying, for one or more frequency bands in a spectrogram that includes at least the end portion of the first audio item and the beginning portion of the second audio item, a window of the overlap duration based on cross-correlation of the end portion of the first audio item and the beginning portion of the second audio item and (ii) modifying the end portion of the first audio item and the beginning portion of the second audio item in the spectrogram such that amplitudes of frequencies within each of the one or more frequency bands is modified in each of the end portion of the first audio item and the beginning portion of the second audio item.

2. The method of claim 1, wherein a sequence of audio items in a playlist of audio items is identified, wherein the sequence of audio items includes the first audio item and the second audio item.

3. The method of claim 2, wherein the second audio item is to be played subsequent to the first audio item.

4. The method of claim 1, wherein the end portion of the first audio item and the beginning portion of the second audio item in the spectrogram are modified such that the amplitudes of frequencies within a frequency band decrease within the spectrogram over the end portion of the spectrogram.

5. The method of claim 1, wherein the end portion of the first audio item and the beginning portion of the second audio item in the spectrogram are modified such that amplitudes of frequencies within the frequency band increase within the spectrogram over the beginning portion of the spectrogram.

6. The method of claim 1, wherein modifying the end portion of the first audio item and the beginning portion of the second audio item further comprises generating the spectrogram that corresponds to the end portion of the first audio item and the beginning portion of the second audio item.

7. The method of claim 1, wherein modifying the end portion of the first audio item and the beginning portion of the second audio item further comprises generating a first spectrogram that corresponds to the end portion of the first audio item and generating a second spectrogram that corresponds to the beginning portion of the second audio item.

8. The method of claim 1, wherein modifying the end portion of the first audio item and the beginning portion of the second audio item further comprises generating a modified version of the first audio item that includes the modified end portion of the first audio item based on the modified end portion of the spectrogram and generating a modified version of the second audio item that includes the modified beginning portion of the second audio item based on the modified beginning portion of the spectrogram.

9. The method of claim 1, wherein the method further comprises identifying the overlap duration based on the spectrogram.

10. The method of claim 1, wherein identifying, for the one or more frequency bands in the spectrogram that includes at least the end portion of the first audio item and the beginning portion of the second audio item, the window of the overlap duration based on the cross correlation of the end portion of the first audio item and the beginning portion of the second audio item further comprises identifying a first window for a lowest frequency band in a series of frequency bands based on the cross-correlation of the end portion of the first audio item in the spectrogram and the beginning portion of the second audio item in the spectrogram within the lowest frequency band.

11. The method of claim 10, wherein identifying, for the one or more frequency bands in the spectrogram that includes at least the end portion of the first audio item and the beginning portion of the second audio item, the window of the overlap duration based on the cross-correlation of the end portion of the first audio item and the beginning portion of the second audio item further comprises identifying a second window for a frequency band adjacent to the lowest frequency band based on the cross-correlation of the end portion of the first audio item in the spectrogram and the beginning portion of the second audio item in the spectrogram within the frequency band adjacent to the lowest frequency band, wherein the second window is shorter than the first window.

12. The method of claim 11, wherein the second window overlaps with the first window.

13. The method of claim 12, wherein phases of the spectrogram of the modified end portion of the first audio item superposed with the modified beginning portion of the second audio item match phases of the first audio item at a beginning portion of the overlap and match phases of the second audio item at an end portion of the overlap.

14. The method of claim 1, wherein modifying the end portion of the first audio item and the beginning portion of the second audio item comprises modifying a tempo of the first audio item during the end portion of the first audio item and a tempo of the second audio item during the beginning portion of the second audio item.

15. The method of claim 14, wherein modifying the tempo of the first audio item during the end portion of the first audio item and the tempo of the second audio item during the beginning portion of the second audio item is in response to determining that the tempo of the first audio item during the end portion of the first audio item differs from the tempo of the second audio item during the beginning portion of the second audio item song by more than a predetermined threshold.

16. The method of claim 1, wherein the method further comprises updating the playlist of audio items by transmitting the modified version of the first audio item and the modified version of the second audio item to a user device in connection with an indication of the overlap duration.

17. The method of claim 1, wherein the method further comprises storing the modified version of the first audio item and the modified version of the second audio item in connection with an identifier of the playlist of audio items.

18. The method of claim 1, wherein the method further comprises:
receiving, from a user device, a request to present a playlist of audio items; and
causing the playlist of audio items to be presented by the user device, wherein presenting the playlist of audio items comprises presenting the modified version of the first audio item and the modified version of the second audio item, and wherein the modified end portion of the modified version of the first audio item is played concurrently with the modified beginning portion of the modified version of the second audio item.

19. A system for transitioning between audio items in playlists, the system comprising:
a hardware processor that:
identifies a first audio item and a second audio item that is to be played subsequent to the first audio item; and
modifies an end portion of the first audio item and a beginning portion of the second audio item, wherein the end portion of the first audio item and the beginning portion of the second audio item are to be played concurrently to transition between the first audio item and the second audio item, wherein the end portion of the first audio item and the beginning portion of the second audio item have an overlap duration, and wherein modifying the end portion of the first audio item and the beginning portion of the second audio item comprises (i) identifying, for one or more frequency bands in a spectrogram that includes at least the end portion of the first audio item and the beginning portion of the second audio item, a window of the overlap duration based on cross-correlation of the end portion of the first audio item and the beginning portion of the second audio item and (ii) modifying the end portion of the first audio item and the beginning portion of the second audio item in the spectrogram such that amplitudes of frequencies within each of the one or more frequency bands is modified in each of the end portion of the first audio item and the beginning portion of the second audio item.

20. A non-transitory computer-readable medium containing computer executable instructions that, when executed by a processor, cause the processor to perform a method for transitioning between audio items in playlists, the method comprising:
identifying a first audio item and a second audio item that is to be played subsequent to the first audio item; and
modifying an end portion of the first audio item and a beginning portion of the second audio item, wherein the end portion of the first audio item and the beginning portion of the second audio item are to be played concurrently to transition between the first audio item and the second audio item, wherein the end portion of the first audio item and the beginning portion of the second audio item have an overlap duration, and wherein modifying the end portion of the first audio item and the beginning portion of the second audio item comprises (i) identifying, for one or more frequency bands in a spectrogram that includes at least the end portion of the first audio item and the beginning portion of the second audio item, a window of the overlap duration based on cross-correlation of the end portion of the first audio item and the beginning portion of the second audio item and (ii) modifying the end portion of the first audio item and the beginning portion of the second audio item in the spectrogram such that amplitudes of frequencies within each of the one or more frequency bands is modified in each of the end portion of the first audio item and the beginning portion of the second audio item.

* * * * *